United States Patent [19]

Sink

[11] Patent Number: 5,678,668
[45] Date of Patent: Oct. 21, 1997

[54] ONE-WAY OVERRUNNING CLUTCH MECHANISM

[75] Inventor: Danny R. Sink, Chester, Va.

[73] Assignee: Brenco, Incorporated, Petersburg, Va.

[21] Appl. No.: 703,058

[22] Filed: Aug. 26, 1996

[51] Int. Cl.$^6$ ................................................ F16D 41/12
[52] U.S. Cl. ........................................ 192/46; 192/45.1
[58] Field of Search ............................. 192/46, 41 R, 192/45.1, 69.8

[56] References Cited

U.S. PATENT DOCUMENTS

| | | |
|---|---|---|
| 2,226,247 | 12/1940 | Lesage . |
| 2,631,446 | 3/1953 | Meyer . |
| 2,864,923 | 12/1958 | Mathews .................... 192/46 X |
| 3,623,582 | 11/1971 | Giger et al. ................... 192/46 |
| 3,838,567 | 10/1974 | Giger et al. ................... 192/46 X |
| 4,570,769 | 2/1986 | Isaka ............................ 192/46 |
| 4,711,331 | 12/1987 | Hoffmann ..................... 192/46 |
| 5,070,978 | 12/1991 | Pires ............................ 192/45.1 |
| 5,449,057 | 9/1995 | Frank ........................... 192/46 |

*Primary Examiner*—Andrea L. Pitts
*Attorney, Agent, or Firm*—Brooks & Kushman P.C.

[57] ABSTRACT

An overrunning clutch comprising annular drive and driven members having generally planar clutch plate sections supported in fixed parallel relation for rotation about a common axis. One clutch plate section has an annular row of ratchet teeth formed in the inner surface and the other clutch plate section has at least one aperture extending therethrough, with an elongated rigid pawl supported on one end of a resilient arm located in the aperture. The aperture provides an abutment surface for one end of the pawl and the resilient arm is biased to urge the other end of the pawl from the aperture to engage the ratchet teeth. The rigid pawl, the resilient arm and the other clutch plate section may be integrally formed, and the clutch assembly may consist of two pieces only.

14 Claims, 2 Drawing Sheets

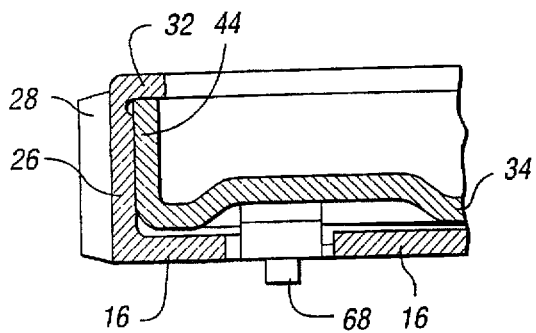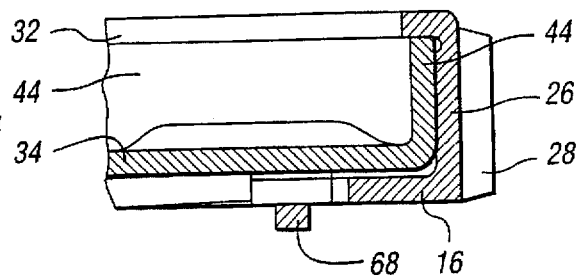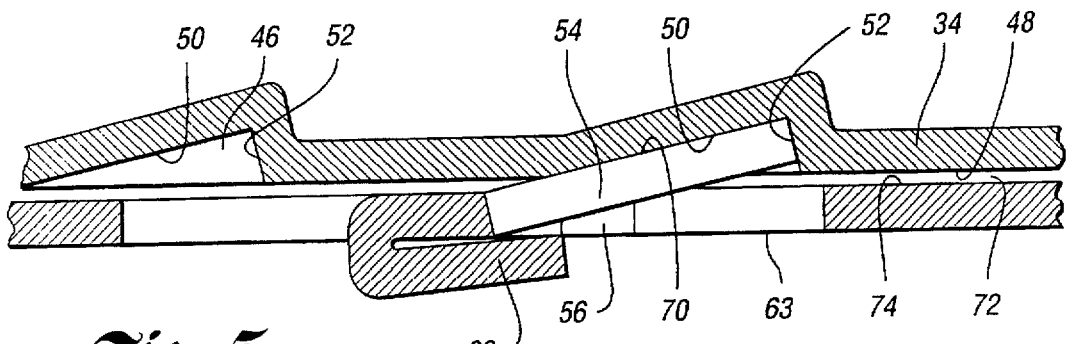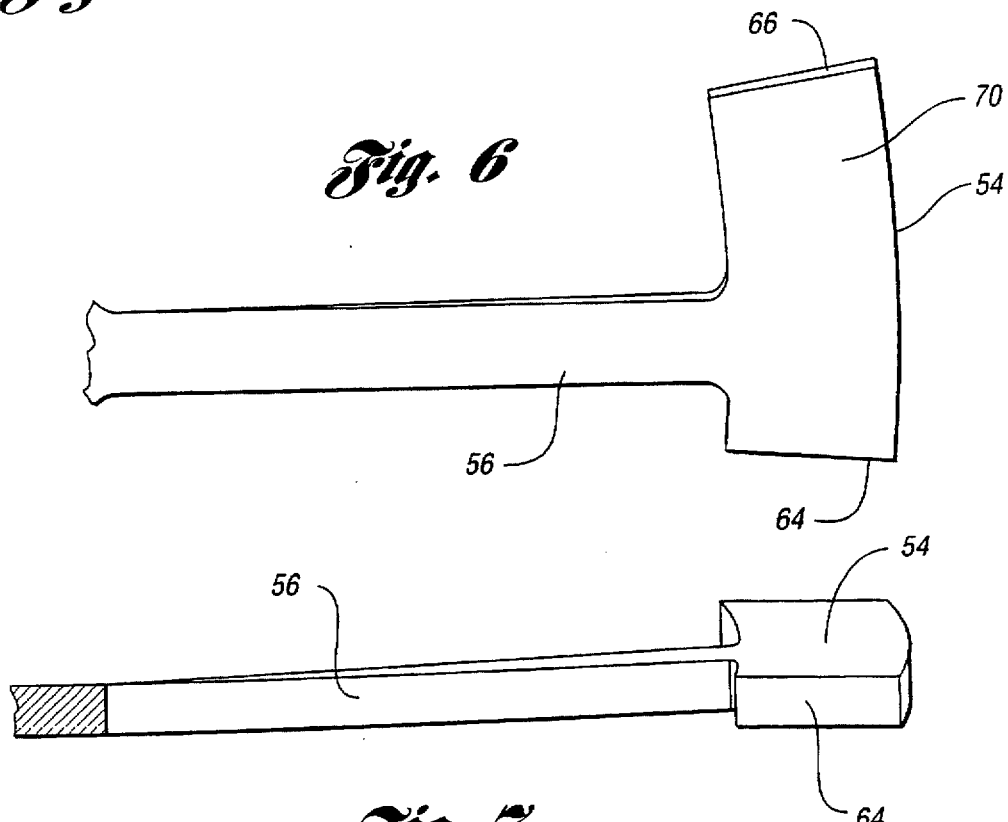

ONE-WAY OVERRUNNING CLUTCH MECHANISM

BACKGROUND OF THE INVENTION

1. Field of the Invention

This invention relates to one-way drive mechanisms and more particularly to an improved one-way pawl and ratchet-type clutch mechanism of high torque transmitting capability and which is of simplified construction and economical to manufacture.

2. Description of the Prior Art

One-way drive mechanisms, hereinafter generally referred to as clutches, are well known and used in a wide variety of applications ranging from low speed high torque ratchet mechanisms such as those employed in hand tools or wrenches to high speed transmission devices employed in complex drive systems for automobiles, aircraft, or the like.

The known one-way clutches, particularly those employed for relatively high torque transmission at low to moderate speeds, have frequently taken the form of a pawl and ratchet drive mechanism. These known mechanisms typically have employed relatively rotatable drive and driven clutch members having opposed surfaces provided with recesses defining shoulders or ratchet teeth for engaging one or more of a plurality of separate pawl members each biased to a position to engage a shoulder or ratchet tooth on both of the relatively rotating members to interlock the two for movement together upon rotation of the drive member in one direction, with the separate resilient means being deformable to permit disengagement between the pawl and the shoulders or ratchet teeth on at least one of the opposed surfaces to permit freewheeling, or relative rotation of the driving member in the opposite direction.

Examples of known pawl and ratchet drive mechanisms may be found, for example, in U.S. Pat. No. 5,449,057, No. 5,070,978, No. 4,711,311, and No. 2,226,247. In U.S. Pat. No. 2,226,247, a camming action provided by a camming surface on one of the clutch members is relied upon to pivot the pawls for engagement and/or disengagement rather than to use a separate resilient spring element urging the pawl to the engaged position. U.S. Pat. Nos. 3,623,582 and 2,631,446 disclose drive mechanisms in which a separate resilient element is disposed between opposing radial faces on the drive and driven coaxial rotary members, and employ leaf spring segments which project into recesses or openings in the opposed surfaces to interlock the members for rotation in one direction while permitting overrunning in the opposite direction. These devices are employed for relatively light-weight operations such as a self-winding watch or a manually operated cigarette lighter flint wheel actuator.

The close tolerances and high strength required for the component parts, and the number and size of those component parts, of known one-way clutches employed for high speed, high torque operations such as those shown in U.S. Pat. Nos. 5,449,057 and 5,070,978, above, have made these devices very expensive to manufacture. Also, the number and size of the component parts has made the automated assembly of the completed devices difficult.

It is, accordingly, a primary object of the present invention to provide an improved one-way drive mechanism which has a minimum number of component parts and which is particularly well suited for drives employed in low to intermediate speed mechanisms.

Another object is to provide an improved one-way drive mechanism which is capable of transmitting high torque loads and which is highly reliable in operation.

It is another object of the present invention to provide such a one-way drive mechanism which is very economical to manufacture and which is substantially maintenance free.

It is another object of the present invention to provide such a one-way drive mechanism in which the pawls and resilient pawl supporting means is rigidly mounted on or integrally formed with one of the drive or driven clutch elements for rotation therewith and for engagement with ratchet teeth carried by the other of the drive or driven clutch elements.

SUMMARY OF THE INVENTION

The foregoing and other objects and advantages are achieved in a one-way drive mechanism according to a preferred embodiment of the present invention which includes an annular drive member and an annular driven member, each having a substantially planar, annular clutch plate section having inner surfaces disposed in closely spaced parallel relation to one another for rotation about a common axis. One of the clutch plate sections has an annular row of spaced ratchet teeth formed on its inner surface and the other clutch plate section has at least one aperture defining an opening for an elongated rigid pawl supported on an elongated resilient arm. A contoured slot preferably extends along the sides of the support arm and a part of the pawl, and a surface of the aperture defines an abutment surface engaging one end of the pawl for transmitting driving torque.

The elongated slot (or slots) may be formed by a stamping, die cutting, laser cutting or other operation to integrally form the elongated rigid pawl and its support arm as a part of the planar clutch plate section, with the support arm being deformed, or twisted, slightly out of the plane of the clutch plate section to normally urge the other end of the pawl into engagement with the ratchet teeth. The support arm is sufficiently resilient to permit the ratchet teeth to cam the pawls back substantially into the plane of its supporting clutch plate section to permit overrunning.

One of the clutch plate members preferably has an axially extending annular rim on its outer periphery, with connecting means such as gear teeth, splines, a key slot or the like for connecting the rim to a rotary drive or rotary driven element. The other of the annular drive member or annular driven member preferably has an axially extending hub on its inner periphery with connecting means on the hub for transferring torque to or from a second rotary element. Retaining means on one of the drive or driven members is provided for engaging the other of the drive or driven members to retain the drive and driven clutch members in assembled relation with the inner surfaces in spaced parallel relation. Preferably the annular drive member and the annular driven member are each integrally formed from a single substantially homogeneous mass of metal material such as a suitable steel sheet material by a drawing and/or die forming. A suitable pawl stop may be formed adjacent each aperture by staking a small tab from the flat clutch plate section and forming the tab into overlying relation with the portion of the elongated slot forming the abutment surface to prevent the end of the pawl from being deflected through the aperture under load.

BRIEF DESCRIPTION OF THE DRAWINGS

The foregoing and other features and advantages of the invention will be apparent from the detailed description contained hereinbelow, taken in conjunction with the drawings, in which:

FIG. 3 is an enlarged fragmentary sectional view of a portion of the structure shown in FIG. 1;

FIG. 4 is an enlarged fragmentary sectional view of another portion of the structure shown in FIG. 1;

FIG. 5 is a further enlarged fragmentary sectional view taken on line 5—5 of FIG. 1;

FIG. 6 is an enlarged top plan view of a pawl and pawl support arm shown in FIG. 2; and FIG. 7 is an elevation view of the structure shown in FIG. 6.

DESCRIPTION OF THE PREFERRED EMBODIMENTS

Figure 1:
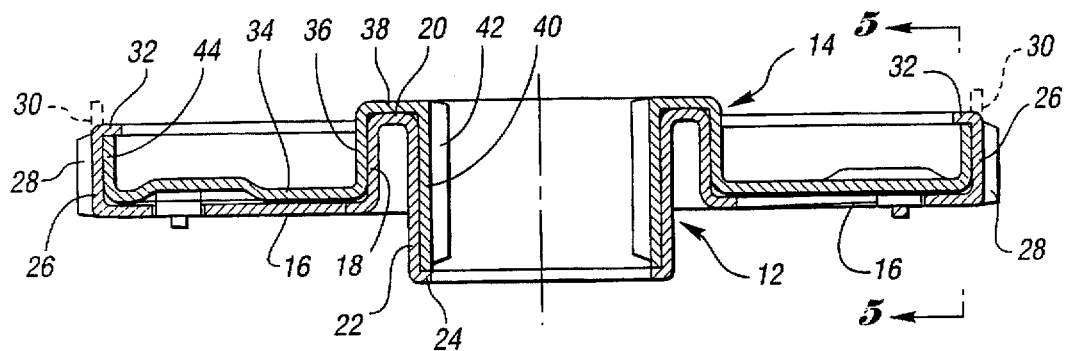
FIG. 1 is a diagrammatic illustration, in section, of a one-way drive mechanism according to the present invention.

Referring now to the drawings in detail, a one-way drive mechanism, or clutch, is designated generally by the reference numeral 10 in FIG. 1. The clutch 10 includes a drive member 12 and a driven member 14 assembled together and supported for coaxial rotation. It will be understood that the terms "drive member" and "driven member" are arbitrary as either member may be driven from a suitable power source to transfer torque through the other member to drive a separate mechanism such as a shaft, gear, chain, belt or other element.

Figure 2:
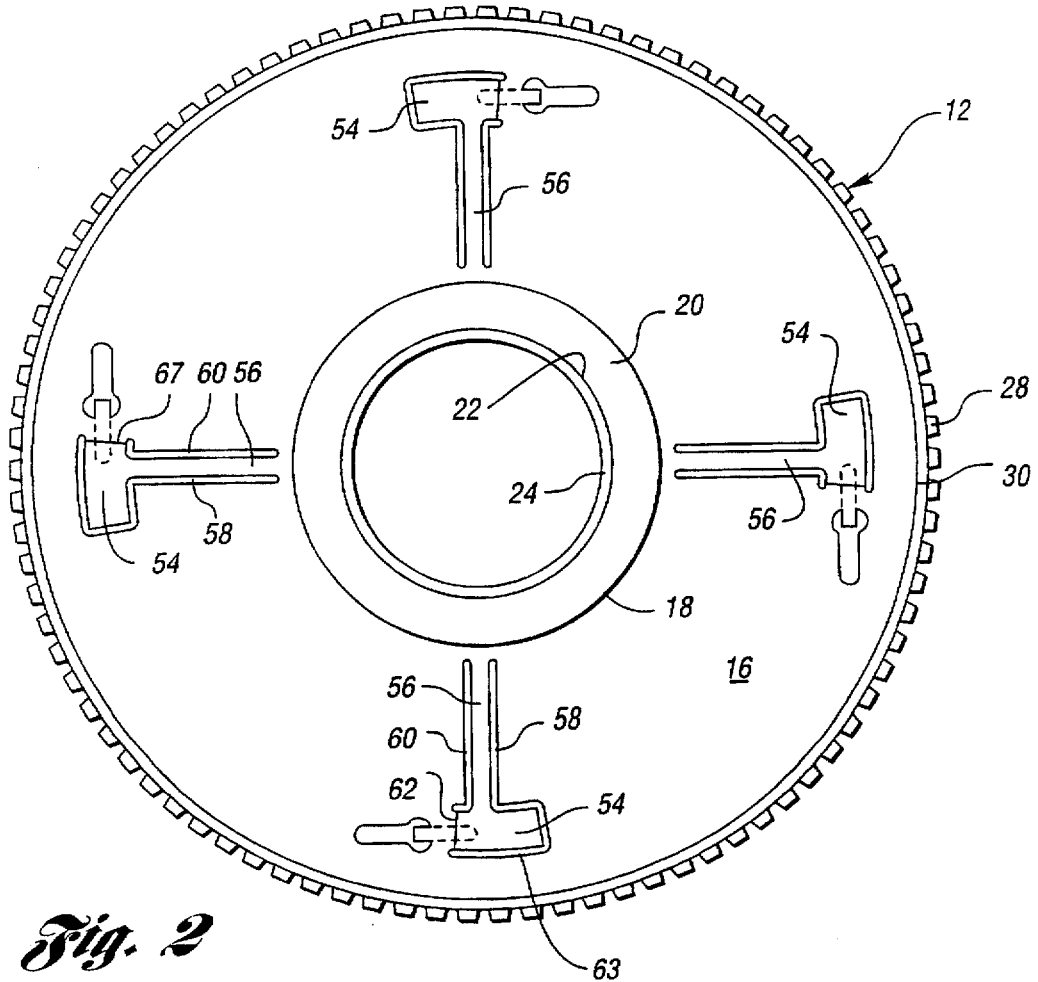
FIG. 2 is a top plan view of the bottom clutch element shown in FIG. 1.

As seen in FIGS. 1 and 2, drive member 12 includes a substantially planar, annular clutch plate section 16 having an integrally formed, axially extending transition section 18 on its inner periphery. Transition section 18, in turn, terminates in a substantially flat, radially extending web portion 20 terminating at its radially inner end in an axially extending hub 22 having an inturned annular short flange 24 on its free distal end. Clutch plate section 16 also has an integrally formed axially extending annular rim 26 around its outer periphery, with suitable drive means such as gear teeth 28 carried on the outer cylindrical surface of the rim. Rim 26 is preferably initially formed with a short axially extending lip 30 (shown in broken lines in FIG. 1) which, upon assembly of the clutch mechanism, is formed inwardly into a short radial flange 32.

As most clearly seen in FIG. 1, driven member 14 also includes a substantially flat planar clutch plate portion 34 terminating at its inner end in an axially extending cylindrical transition element 36 which terminates in a radially extending, substantially planar web portion 38 having integrally formed on its inner periphery an axially extending hub 40. Hub 40 has an outer cylindrical surface telescopingly received in the hub 22 for relative rotation therein, with hub 40 having its free end terminating in abutting relation with the flange 24 on member 12. Suitable drive means such as gear teeth 42 are formed on the inner periphery of hub 40 for transmitting torque to a shaft or other element, not shown.

Annular clutch plate section 34 also terminates at its outer periphery in an axially extending rim portion 44 having a cylindrical outer surface telescopingly received within the inner cylindrical surface of hub 26 for relative rotation therein. The free end of hub 44, when drive and driven members 14 and 16, respectively, are assembled together, abuts against the inturned inner surface of flange 32 so that flanges 32 and 24 fix the drive and driven members against axial movement relative to one another to maintain the inner opposing surfaces of clutch plates sections 16 and 34 in fixed parallel closely spaced relation to one another.

Drive and driven members 12 and 14, respectively, are preferably formed by a drawing operation from a single sheet of high strength steel material. During the drawing operation, a plurality of spaced ratchet teeth, or depressions 46 are formed in an annular ring on the inner surface 48 of plate section 34. Each depression 46 is formed with an inclined surface or ramp portion 50 and an abutment surface or shoulder 52 for receiving and engaging one of the pawls 54 carried by the clutch plate section 16.

The pawls 54 are preferably formed as an integral part of the clutch plate section 16 of the drive member 12, and preferably a plurality of such pawls are formed at spaced intervals at a location to engage the ratchet teeth 46 when the clutch is assembled and members 12 and 14 are rotated relative to one another. In this preferred embodiment, each pawl 54 is integrally formed on the free end of an elongated support arm 56. As best seen in FIG. 2, pawls 54 and arms 56 are defined by a first elongated, contoured slot segment 58 extending along one side of each arm 56 and continuing along the inner radial edge of pawl 54, then along one end and along the full radial outer edge of pawl 54. A second elongated slot, or slot segments 60, extend along the other side edge of arm 56 and along a portion of the radial inner edge of pawl 54. The pawl 54 is severed, as in a shearing operation, along a straight line 62 so that each of the pawls 54 are supported by its associated arm 56 in a contoured cutout or opening 63 in the clutch plate section 16. The pawls and supporting arms are joined at a location closer to one end of the pawl, namely, the trailing end 64 adjacent shear line 62.

As best seen in FIGS. 6 and 7, the support arms 56 are twisted slightly from the plane of plate section 16 so as to project the forward or drive end surface 66 of the pawls 54 toward the clutch plate section 34, with the trailing end 64 of each pawl remaining within the cutout opening in abutting relation with the clutch plate 16 along line 66. In order to prevent the pawl 54 from being deflected outward through the cutout opening in plate 16 under load, a tab portion 68 is severed, as in a die cutting or stamping operation, along three sides. The tab 68 is then deformed out of the plane of plate section 16 and formed around to overlie a portion of the trailing edge of the pawl cutout 63 and to underlie the trailing end 64 of the pawls 54.

The elongated arms 56 are sufficiently resilient so that the inwardly directed substantially planar surface 70 of each pawl will be deflected by contact with the inner surface 48 substantially into the plane of clutch plate section 16 to permit overrunning of the clutch as by relative movement of clutch plate section 34 to the right as seen in FIG. 5. If necessary, the support arms 56 may be ground to provide a reduced cross section, or lightening holes or grooves may be provided along the length of the respective arms to obtain the desired torsion bar or spring effect tending to urge the leading edge 66 toward inner surface 48 with the desired force whereby, when a depression 46 moves past a pawl 54 in the overrunning operation mode, the resilient arm 56 will project the pawl 54 to the position shown in FIG. 5, with the top surface 70 engaging the inclined ramp portion 50 of the respective ratchet teeth or depressions 46. Continued relative movement in the overrunning direction will cause the ramp portion 54 to cam the pawl back into the opening 63 in the clutch plate section 16 to permit free overrunning.

When the drive member is moved in the torque transmitting direction, or to the right in FIG. 5 relative to the driven member, the resilient arm 56 will project one or more of the pawls 54 into a depression 46 until the edge surface 66 comes into abutting relation with shoulder 52. The relatively close spacing of clutch plate sections 16 and 34 permits the pawls 54 to make a very small angle relative to the planes of the clutch plate sections so that only a relatively small component of axial force is transmitted through the pawl tending to separate or increase the spacing 72 between the inner surfaces 48 and 74 as seen in FIG. 5. Thus, the mechanism may be made from relatively lightweight material and still be capable of transmitting very high torque loads. At the same time, the mechanism is of very simple construction and has a minimum of parts whereby assembly is facilitated and maintenance is substantially eliminated.

The overrunning drive mechanism according to the present invention may be used in a wide variety of applications, but is particularly well adapted for use in low to moderate speed drives such as might be employed in boat winches, bicycle drives or the like.

It should be understood that various modifications might be made to the structure as described hereinabove without departing from the spirit of the invention. For example, the pawls and support arms could be separately manufactured and joined to the clutch plate section of the drive member, in a generally hammer-shaped cutout or opening, by suitable means such as welding. Also, it is believed apparent that the support arms and pawls, as well as the ratchet teeth or depressions, may be formed in various ways. For example, a laser cutting operation may be employed to shape the pawls and support arms. Also, it is believed apparent that various drive arrangements might be employed on the outer periphery of rim 26 and the inner periphery of hub 40. For example, while the gear teeth illustrated at 28 and 40 might be formed, as by a simple rolling operation, other means such as key-ways or splines may be integrally formed on the rim and hub, or a separate drive mechanism such as a sprocket may be separately formed and attached to the outer periphery of the rim 26.

While I have disclosed and described a preferred embodiment of the invention, I wish it understood that I do not intend to be restricted solely thereto, but rather that I intend to include all embodiments which would be apparent to one skilled in the art and which come within the spirit and scope of the invention.

What is claimed is:

1. A one-way overrunning clutch assembly comprising an annular drive member and an annular driven member, said drive member and driven member each including a substantially planar annular clutch plate section having an inner surface, said inner surfaces being disposed in closely spaced parallel relation to one another for rotation about a common axis, one of said clutch plate sections having an annular row of spaced ratchet teeth formed in its inner surface, the other said clutch plate section having at least one aperture extending therethrough, an elongated pawl support arm having one end rigidly joined to said other clutch plate section and disposed in each said at least one aperture, an elongated rigid pawl having free ends and being joined to the other end of each said support arm and supported thereby in each said at least one aperture in alignment with said row of ratchet teeth, each said at least one aperture providing a shoulder engaging one of said free ends for transferring driving force therebetween, the other of said free ends of each said pawl projecting outwardly from said aperture in the direction of the inner surface of said other clutch plate section, an axially extending annular rim on the outer periphery of one of said drive or driven members, said annular rim having power transfer means thereon for engaging and transferring power to or from an external element, an axially extending hub on the inner periphery of the other of said drive or said driven member, said axially extending hub having means thereon for engaging and transferring power to or from another external element, and retaining means on at least one of said drive and said driven members engaging the other of said drive or driven members to retain said overrunning clutch in assembled relation with said inner surfaces in said spaced parallel relation, each said at least one support arm continuously resiliently urging said other end of the pawl supported thereon toward said one clutch plate section to engage one of said ratchet teeth to interlock said drive and driven members for rotation together in one direction, each said at least one support arm and pawl being resiliently deflected to disengage each said pawl from said ratchet teeth to permit free relative rotation between said drive and driven members in the other direction.

2. The clutch assembly according to claim 1 wherein said other clutch plate section, wherein said elongated pawl support arms and said elongated pawls are integrally formed from a single mass of metal.

3. The clutch assembly according to claim 2 further comprising stop means integrally formed with said other clutch plate section and overlying a portion of each said at least one aperture on the side opposite said inner surface, said stop means engaging said one free end of the pawl in the respective aperture to prevent movement of the pawl through said other clutch plate section in a direction away from said one clutch plate section.

4. The clutch assembly according to claim 2 wherein said power transfer means on said annular rim comprises an annular row of gear teeth extending around said annular rim.

5. The clutch assembly according to claim 2 wherein said power transfer means on said hub comprises an annular row of gear teeth extending around said hub.

6. The clutch assembly according to claim 1 wherein said retaining means comprises means on each of said drive and said driven members engaging the other of said drive and driven members for retaining said clutch in assembled relation with said inner surfaces in fixed parallel relation.

7. The clutch assembly according to claim 6 wherein said power transfer means on said annular rim and said power transfer means on said axially extending hub comprise annular rows of gear teeth for engaging mating gear teeth on rotatable machine elements for the transfer of power therebetween.

8. The clutch assembly according to claim 7 wherein said other clutch plate section, said elongated pawl support arms and said elongated pawls are integrally formed from a single mass of metal.

9. The clutch assembly according to claim 8 further comprising stop means integrally formed with said other clutch plate section and overlying a portion of each said at least one aperture on the side opposite said inner surface, said stop means engaging said one free end of the pawl in the respective aperture to prevent movement of the pawl through said other clutch plate section in a direction away from said one clutch plate section.

10. A two-piece, one-way overrunning clutch for transferring power between two rotatable machine elements, said clutch comprising an annular drive member and an annular driven member, each including a substantially planar annular clutch plate section having an inner surface with said inner surfaces disposed in closely spaced parallel relation to one another for rotation about a common axis, one of said clutch plate sections having an annular row of spaced ratchet teeth formed in its inner surface, the other said clutch plate section having a first aperture extending therethrough, an elongated pawl support arm having one end integrally formed with said other clutch plate section and disposed within said first aperture, an elongated rigid pawl integrally formed on the other end of said support arm, said pawl having circumferentially spaced free end surfaces and being supported in alignment with said row of ratchet teeth, said aperture providing a shoulder engaging one of said free end surfaces of said pawl, retaining means integrally formed on at least one of said drive or said driven members and engaging the other of said drive or driven members to retain said inner surfaces in said spaced parallel relation, and connecting means on said drive member and on said driven member for connecting one with each of the two rotating machine elements for transferring power therebetween, said support arm continuously resiliently urging the other free end surface of said pawl outwardly from said aperture toward said one clutch plate section to engage one of said ratchet teeth to interlock said drive and driven members for rotation together in one direction, said support arm and pawl being resiliently deflected toward said aperture to permit free relative rotation between said drive and driven members in the other direction.

11. The overrunning clutch according to claim 10 wherein said other clutch plate section has a plurality of said apertures formed therein, and wherein each said aperture has an elongated pawl support arm disposed therein, each said elongated pawl support arm supporting an elongated rigid pawl.

12. The overrunning clutch according to claim 11 further comprising stop means integrally formed with said other clutch plate section and overlying a portion of each said at least one aperture on the side opposite said inner surface, said stop means engaging said one free end of the pawl in the respective aperture to prevent movement of the pawl through said other clutch plate section in a direction away from said one clutch plate section.

13. The overrunning clutch according to claim 12 wherein said connecting means comprises an annular rim on one of said drive or said driven members and an annular hub on the other of said drive or said driven members, and an annular row of gear teeth formed around said rim and said hub.

14. The overrunning clutch according to claim 13 wherein said retaining means comprises a generally radially extending flange formed on said rim and on said hub.

* * * * *